(12) United States Patent
Sivakumar et al.

(10) Patent No.: US 6,219,829 B1
(45) Date of Patent: Apr. 17, 2001

(54) COMPUTER SOFTWARE TESTING MANAGEMENT

(75) Inventors: Arunachallam Sivakumar, Woburn; Stephen L. Kaufer, Newton, both of MA (US)

(73) Assignee: Compuware Corporation, Farmington Hills, MI (US)

( * ) Notice: Subject to any disclaimer, the term of this patent is extended or adjusted under 35 U.S.C. 154(b) by 0 days.

(21) Appl. No.: 09/500,047

(22) Filed: Feb. 8, 2000

Related U.S. Application Data

(63) Continuation of application No. 08/838,090, filed on Apr. 15, 1997, now Pat. No. 6,031,990.

(51) Int. Cl.$^7$ .................................................. G06F 11/00
(52) U.S. Cl. ........................................... 717/4; 717/8
(58) Field of Search ............................................ 717/8, 4

(56) References Cited

U.S. PATENT DOCUMENTS

| | | | |
|---|---|---|---|
| 5,313,616 | 5/1994 | Cline et al. | 717/4 |
| 5,357,452 | 10/1994 | PioDiSavoia et al. | 702/108 |
| 5,390,325 | 2/1995 | Miller | 714/38 |
| 5,490,249 | 2/1996 | Miller | 714/38 |
| 5,500,941 | 3/1996 | Gil | 714/38 |
| 5,715,461 | 2/1998 | Yoshitomi | 717/10 |
| 5,784,553 * | 7/1998 | Kolawa et al. | 714/38 |
| 5,794,043 * | 8/1998 | Kolb | 717/4 |
| 5,974,255 * | 10/1999 | Gossain et al. | 717/4 |
| 6,023,580 * | 2/2000 | Sifter | 717/4 |
| 6,031,990 | 2/2000 | Sivakumar et al. | 717/4 |

OTHER PUBLICATIONS

Doong et al., Case studies on Testing Object–Oriented Programs, ACM pp. 165–177, 1991.*
Harrold et al., Incremental Testing of Object–Oriental Structures, ACM, pp. 68–80, 1992.*
"Buster" Test Management System User's Guide, AT&T, Issue 5, 09/94, Chapters 3, 4 and 9.
Bellcore, MYNAH™ System User Guide, Executive, Analyst, Feather Domain Driver, May 1993; Chapters 4, 5, 8 and 9.
TestExpert Automated Test Management System, User and Administrator Guide, Col. 1, Qualtrak, Release 2.1, vol. 1, Chapters 4, 6, 7 and 9; 1993.
Compuware QADirector User's Guide, A QACenter Application Testing Product, Release 2.3, 1997; entire document.
SQA Robot™ User's Guide, Developing and Executing Automated Tests for Cross–Windows™ Client/Server, 1996 Applications, Chapters 2, 5 and 8.
Mercury Interactive, WinRubber, User's Guide, Version 4.0, Part VIII, pp. 291–312, 1996.
The GNU Testing Framework, DejaGnu, http://www.gnu.org/manual/dejagnu/text/dejagnu.txt., 1996, pp. 1–48.
Mercury Interactive, TestDirector User's Guide, Chapters 9 and 11.

\* cited by examiner

*Primary Examiner*—Mark R. Powell
*Assistant Examiner*—John Q. Chavis
(74) *Attorney, Agent, or Firm*—Fish & Richardson P.C.

(57) ABSTRACT

A test management system is provided having high flexibility of test structuring capabilities, and fine-grained control over how tests are executed. The test management system is extensible; i.e., it can integrate with modern testing tools without requiring a modification of the system itself. More specifically, the test management system uses concepts such as encapsulation and inheritance in order to provide powerful test structuring and test execution capabilities and a framework for integrating with multiple "point tools" that create test cases or help analyze the state of a software program. As is the case with object-oriented software, the test management system is very extensible and new point tools can easily be integrated with the system. The test management system also allows reuse of "rules" specified at different levels in the test structure.

17 Claims, 8 Drawing Sheets

101. Execute rules applied to CreditCheck a. Set environment variables defined in CreditCheck, then environment variables defined at test execution time.

b. Execute setup rules applied at test execution time, then those applied to CreditCheck.

102. Execute rules applied to Server a. Set environment variables defined in CreditCheck, then environment variables defined in Server, then environment variables defined at test execution time.

b. Execute setup rules applied to Server and defined in other locations in the following order:
   - test execution time inherited by all descendents
   - CreditCheck inherited by all descendents
   - Server 103. Execute s-apply a. Set environment variables defined in CreditCheck, then environment variables defined in Server, then environment variables defined in s-apply, then environment variables defined at test execution time.

b. Execute setup rules defined for s-apply and inherited from other locations in the following order:
   - test execution time
   - CreditCheck
   - Server
   - s-apply c. Execute the run command of s-apply.

d. Execute the pass/fail commands defined for s-apply and inherited by s-apply from other locations in the following order:
   - s-apply
   - Server
   - CreditCheck
   - test execution time e. Execute cleanup commands defined for s-apply and inherited by s-apply from other locations in the following order:
   - *s-apply*
   - Server
   - CreditCheck
   - text execution time → To 104

FIG. 8A

COMPUTER SOFTWARE TESTING MANAGEMENT

This is a Continuation of U.S. patent application Ser. No. 08/838,090, filed Apr. 15, 1997 U.S. Pat. No. 6,031,990, the text appendix of which is incorporated herein by reference.

A claim of copyright is hereby made by CenterLine Software, Inc. with respect to the software code contained in Text Appendix A, as of the date of first issuance of a U.S. patent or foreign patent publication based on this application. The copyright owner. has no objection to the facsimile reproduction by anyone of Text Appendix A as it appears in the Patent and Trademark office patent file or records, but reserves all other copyright rights whatsoever.

BACKGROUND OF THE INVENTION

The invention relates to the field of software testing, and more particularly to a software infrastructure called a "test management system" that manages the numerous tests and processes that are used to ensure the quality of a software application.

Test management systems are typically homegrown, i.e., non-commercial, systems built in-house at various software companies or divisions within a software company. These test management systems structure the tests and may provide a certain degree of control over how the tests are executed. Certain test management systems may be integrated with other modern testing tools if the test management system itself is modified.

SUMMARY OF THE INVENTION

The invention provides a method of managing processes for ensuring quality of a software application. The method is implemented in a programmed computer that includes a processor, a data storage system, at least one input device, and at least one output device. The method includes the following steps:

A) A hierarchy of tests is created and stored in the data storage system of the computer based on input data received through an input device of the computer. The tests include test classes and test cases. Each test case is a procedure that has a run command for verifying at least one function of the software application. Each test class is a collection of at least one descendant test case or test class. At least one of the tests in the hierarchy has a pre-execution rule for performing a pre-requisite action prior to execution of the test. At least one of the tests in the hierarchy has at least one post-execution rule for performing an action after execution of the test B) Any pre-execution rules of a root test class in the hierarchy are executed.

C) A plurality of descendants of the root test class are executed. This includes the following steps for each executed descendant:

c1) if a descendant is a test class, executing any pre-execution rules of the descendant test class, then executing step C) for the descendant test class replacing the descendant test class for the root test class, and then executing any post-execution rules of the descendant test class; and c2) if a descendant is a test case, executing any pre-execution rules of the test case, then executing a run command of the test case, and then executing any post-execution rules of the test case.

D) Any post-execution rules of the root test class are executed; and

E) Output information based on the run commands of the test cases is applied to an output device of the computer.

The present invention provides a test management system with highly flexible test structuring capabilities, and with fine-grained control over how tests are executed. The test management system is extensible; i.e., it can integrate with current testing tools or new tools without requiring a modification of the system itself.

More specifically, the test management system according to the present invention uses the concepts of encapsulation and inheritance in order to provide powerful test structuring and test execution capabilities and a framework for integrating with multiple "point tools" that create test cases or help analyze the state of a software program. The test management system is very extensible and new point tools can easily be integrated with the system. The test management system also allows reuse of "rules" specified at different levels in the test structure.

Numerous other features, objects, and advantages of the invention will become apparent from the following detailed description when read in connection with the accompanying drawings.

DETAILED DESCRIPTION

The test management system according to the invention creates "test cases," which are used to verify the correctness of one or more functions of a software application. A "test case" is a procedure that verifies a certain function of the software application and records the result (e.g., pass, fail, test unrunnable). It is the smallest unit in a tree hierarchy created by the test management system.

The test management system also creates "test classes." A test class is an abstract collection of one or more test cases that will test a certain component of a software program, and/or of one or more other test classes that in turn include, directly or indirectly, one or more test cases. Typically, the descendant classes of a test class test pieces of the component that the class is designed to test. Test cases test one or more functions of the software application being tested, and therefore do not have any descendants. The entire collection of tests is structured in a tree hierarchy.

The term "test" will be used herein to refer to test classes as well as test cases.

A test hierarchy often mirrors the design of a software application that is being tested. Test cases and test classes that test a certain component of the software application are generally grouped together. Because the tree can be of indefinite depth and a test class at any level can have any number of children, this model can be used to plan and design the test structure for any software application to be tested.

Figure 1:
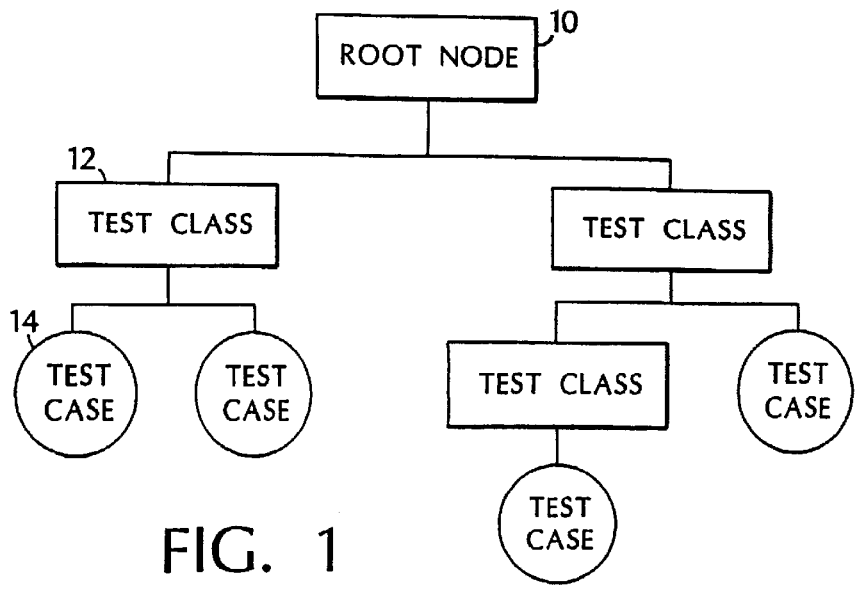
FIG. 1 is a block diagram of a hierarchy of test classes and test cases in accordance with the invention.

FIG. 1 shows an example of a hierarchy of "test classes" and "test cases" created by a test management system according to the invention. The hierarchy has a root node 10, one or more test class nodes 12, and one or more test case nodes 14. In the hierarchical structure, test cases are terminal nodes or "leaf nodes." Therefore, they do not have descendant test classes or cases.

A user of the test management system can request that the test management system visually present the hierarchical tree to the user, so that at a glance the end user can obtain a comprehensive view of all the tests.

Tests may need to be executed in a certain sequence or "execution order," because one test might otherwise interfere with another test or depend on the success or failure of another test. Each test in the hierarchy has an execution sequence number associated with it. The tests are executed in the order specified. Classes are executed in a hierarchical order with parent classes being executed before the descendants. An execution order is tied to the immediate children of each test class. The child test classes and cases can be assigned an execution sequence number and if the sequence is defined, then the child test classes and cases of the test class will be executed in that sequence. There is also an implicit execution order imposed by the tree hierarchy.

Tests can include special logic called "rules," which are used to test the subsystem. A child test class of a test class generally contains further specialized tests for the subsystem by defining additional rules and more test classes and cases. As is explained below, these rules may or may not be "inherited" by the descendants. A test class contains information on rules defined for the class, and a list of child test classes and child test cases.

In the illustrated embodiment four rule categories are environment variables, setup commands, pass-fail commands, and cleanup commands.

For example, tests sometimes require certain "setup commands" to setup the correct pre-conditions before the test can be executed, and certain "cleanup commands" to subsequently restore the condition of the system to the initial state. Setup commands prepare for test execution, such as starting processes or copying files. Cleanup commands perform tasks such as copying or deleting files, and terminating processes, after tests have run. Additionally, tests generally require certain "pass-fail commands" (which may generate multi-valued output) to determine the outcome of the test according to a user-defined criterion. A single test may cause multiple components of the software to interact and the behavior of all components may need to be verified at the end to determine the outcome of the test. Some tests that test a subsystem of the application may have some common setup and cleanup logic.

Setup, pass-fail and cleanup commands are typically generic programs that are run by the computer. They can be simple programs supported by the operating system, e.g. the 'cp' utility in UNIX (a program used to copy files), or user-defined programs that perform a specific task. The success or failure of the commands is determined by the return code of the command. For instance, in UNIX, a return code of zero implies success and any other return code implies a failure. Any alternative return code for success could be specified, or an application programming interface could be used to signify a pass or failure.

Environment variable rules create the environment in which tests run. An environment variable defines and passes data to an application or a system command before the application or command begins execution. An environment variable consists of a name and a value. The value of a variable at execution time can affect the execution of programs that use the variable. Most operating systems support passing data this way, including UNIX, WINDOWS NT, and WINDOWS 95.

Before a test case is run, its environment variables need to be set and setup commands need to be executed. The "run" command of a test case performs the action of the test (a test class does not have a "run" command associated with it). A test case has its own rules. After the run command of the test case finishes, pass-fail commands are executed to determine whether the test met a user-defined criterion. In the test hierarchy, the environment variables and setup commands defined in a test class are executed before those at the descendant levels and the cleanup commands defined for the class are executed after the cleanup commands of all the descendants are executed.

When setup, cleanup, or pass-fail commands defined at a test case or class are executed, or when the run command of a test case is executed, contextual information such as the hierarchy information (i.e., information about the parent test class and child test classes and cases at any level in the hierarchy) as well as result information (pass or fail) about these test cases and classes are available to the test in the form of environment variables and API commands defined by the test management system. This information allows finer control of the execution of the test and its rules based on the position of the test in the hierarchy.

Figure 3:
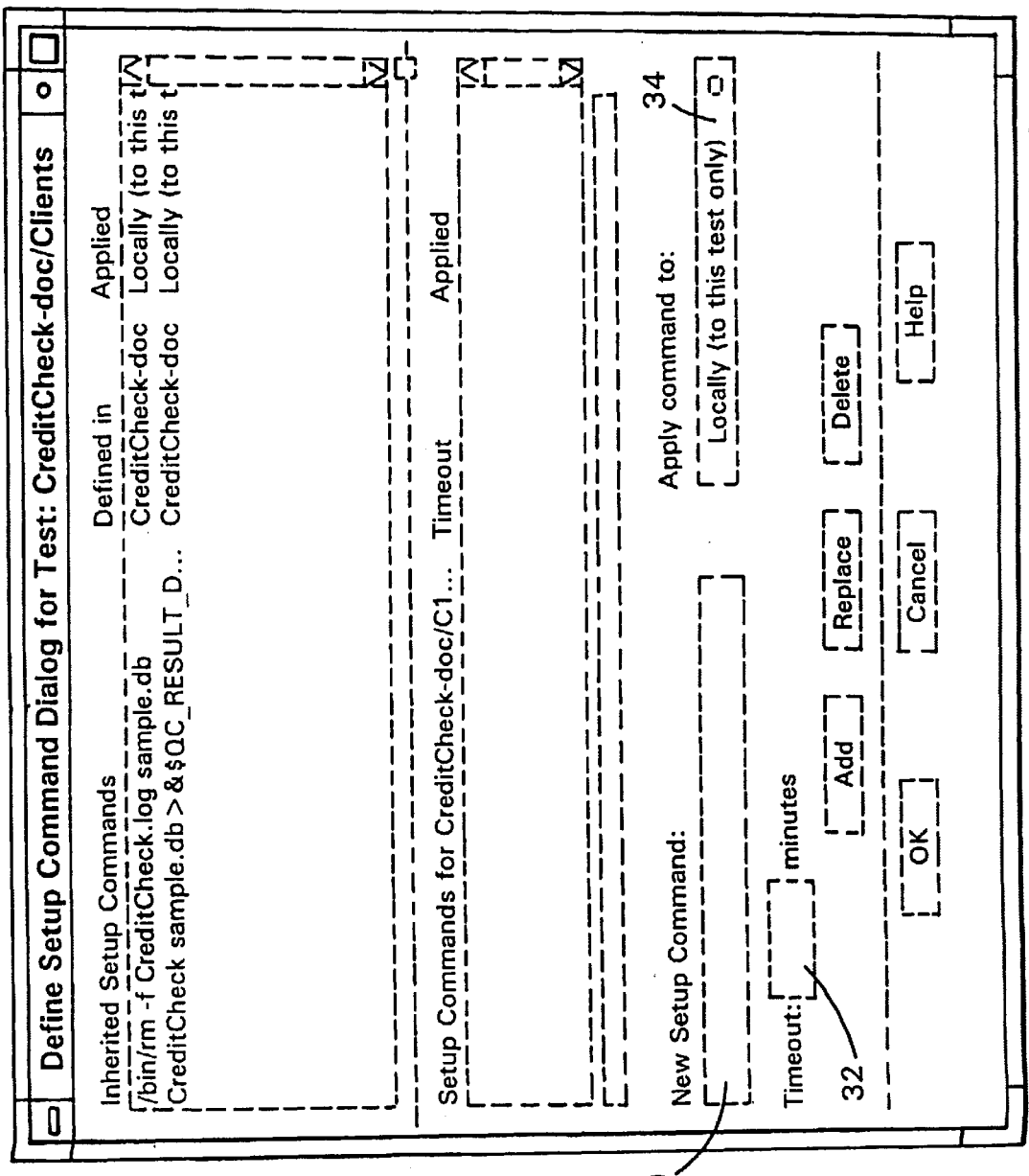
FIG. 3 is a screen display of a define command dialog window created by a test management system according to the invention.

Setup, pass-fail, and cleanup commands are executed by the test management system. FIG. 3 shows one example of how to define a setup command. Each setup, pass-fail, and cleanup command 30 has a timeout value 32 that specifies an amount of time in minutes. If the command does not complete within the specified timeout period, it is assumed to have failed.

The scope 34 of the command is also stored as part of the command description. The scope of each rule depends on the rule type. For example, pass-fail commands defined for a test class may be applied only to descendant cases. Setup and cleanup commands defined for a test class may apply only to the class, to descendant classes only, to descendant cases only, or all descendant test cases and classes. Test cases do not have any descendants; therefore, rules apply only locally.

Figure 4:
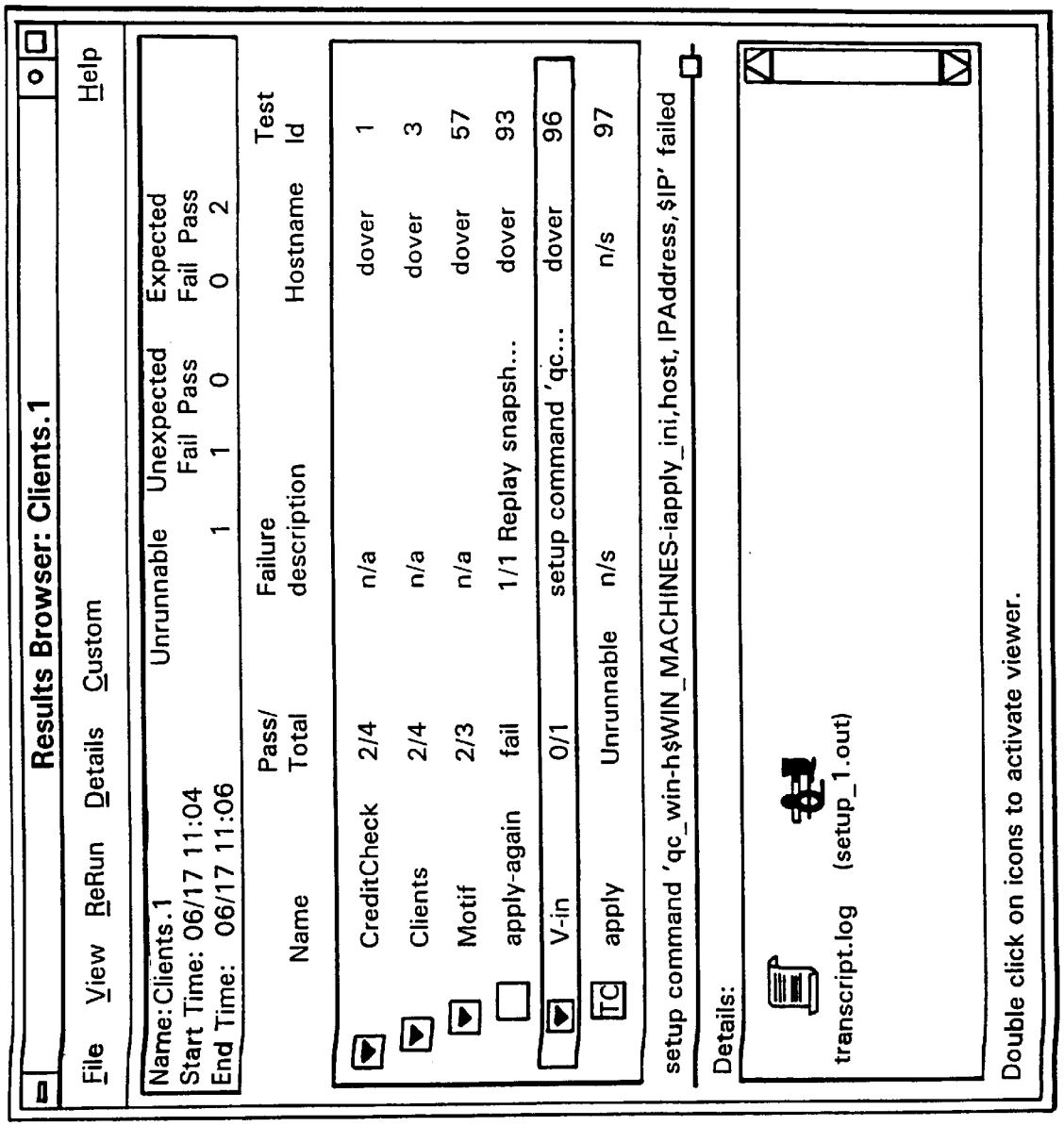
FIG. 4 is a screen display of a results browser window created by a test management system according to the invention.

The setup, pass-fail, and cleanup commands return numeric status codes when they finish executing. By default, a return code of "0" indicates success and any other return code indicates failure. However, the invention allows a user to specify an alternate numeric code to indicate success. FIG. 4 shows test results for a test named "Win" that failed.

In addition to the rules defined in a test, rules can also be defined when a collection of tests are set up to be executed. These rules are executed in addition to the ones that are defined in the hierarchy. Rules defined at execution time can generally be applied to the root class only or can be inherited to descendant cases and classes.

The test management system stores test cases in a shared repository, in order to provide a structured and disciplined approach to software testing. To test a complex piece of software, several thousands of such "test cases" may need to be created.

Figure 2:
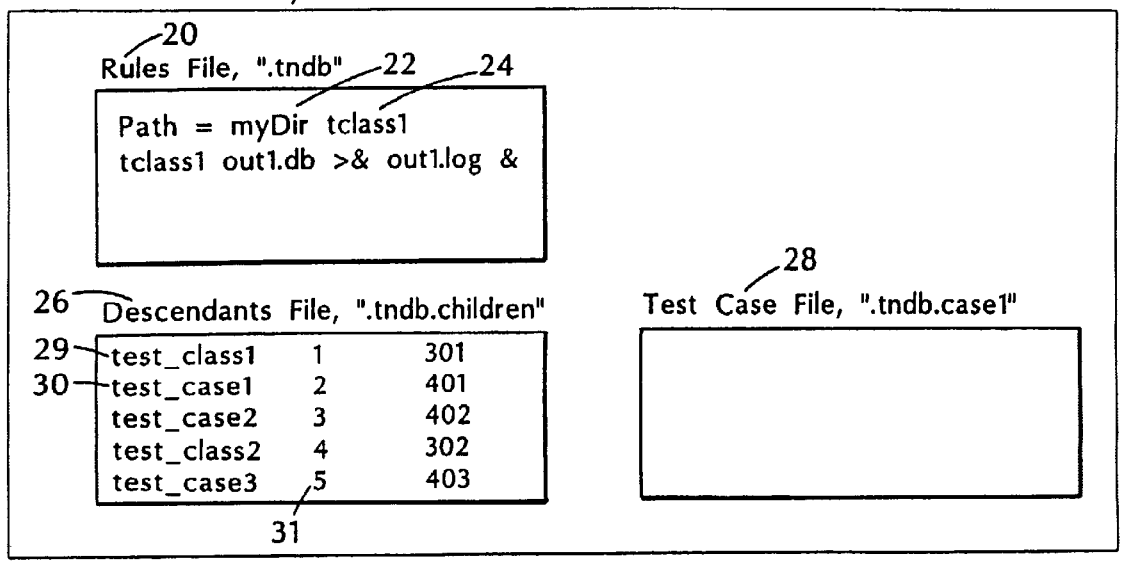
FIG. 2 is a diagram of a test class directory, created by a test management system according to the invention, that includes a rules file, a descendants file, and a test case file.

In one embodiment, the test management system uses the computer file system to organize and store information about test classes and cases. Each test class has a unique directory, as shown in FIG. 2. Test cases can have a unique directory or share a directory with its parent test class. A test class directory contains a file that lists the rules defined for the class. The rules file 20 is identifiable by a unique name, such as ".tndb". It is readily readable because it is stored in a text format. All the rules defined for a test in the test hierarchy are stored in the directory associated with the test class or case.

The structure of a test class directory is shown in FIG. 2. Rules file 20 contains the rules associated with the test class (for example, an environment variable consisting of a name 22 and an assigned value 24, i.e., a name-value pair, in a textual form). The test class directory also contains a text-formatted file 26 listing all descendants of the class. The system recognizes this file by a unique file name such as ".tndb.children". It lists all test classes and test cases that are children of the class. Each element of the list stores the name of the test class 29 or test case 30, execution order number 31 of the test class or case within the list, and a system-assigned unique numeric identification 32 of the child.

Each test case may have its own unique test case directory, or may share the directory of a parent test class. If a given test case has a unique test case directory, a file with an identifiable name (e.g., ".tcdb," not shown) stores information about the rules, the run command, and other information associated with the test case. If a given test case shares a parent's directory, a file 28 named ".tcdb.<name of testcase>" stores the relevant information about the test case.

A collection of tests in the hierarchy may be executed on one or more "test" computers. To execute the specified test cases and classes, the commands associated with the rules are executed. For each command invocation, the computer needs to start a process. To facilitate this, the "test" computer needs to be running an agent program provided by the test management system before the test management system uses that computer to execute commands. The test management system can specify any computer running one of these agent programs to run the collection of tests.

In order to execute a collection of hierarchical tests, the test management system starts two processes, a "test driver" and a "test engine," via the agent program on the test computer. The test management system communicates to the agent program by means of a socket, which is a low-level software mechanism that supports network communications. The system informs the agent program to invoke these processes. The test driver controls the execution of all of the tests in the hierarchy and records the results of all test classes and cases. The test driver communicates requests to the test engine to run commands on its behalf. The test engine invokes and executes these commands.

Once started, the test driver reads information about the test hierarchy in the rules, descendants, and test case files (e.g., ".tndb", ".tndb.children", and ".tcdb" files in FIG. 2). The test driver stores a record data structure for each test class and each test case. These data structures have a field for each of the various types of rules. The rules may be stored in array form.

Figure 5:
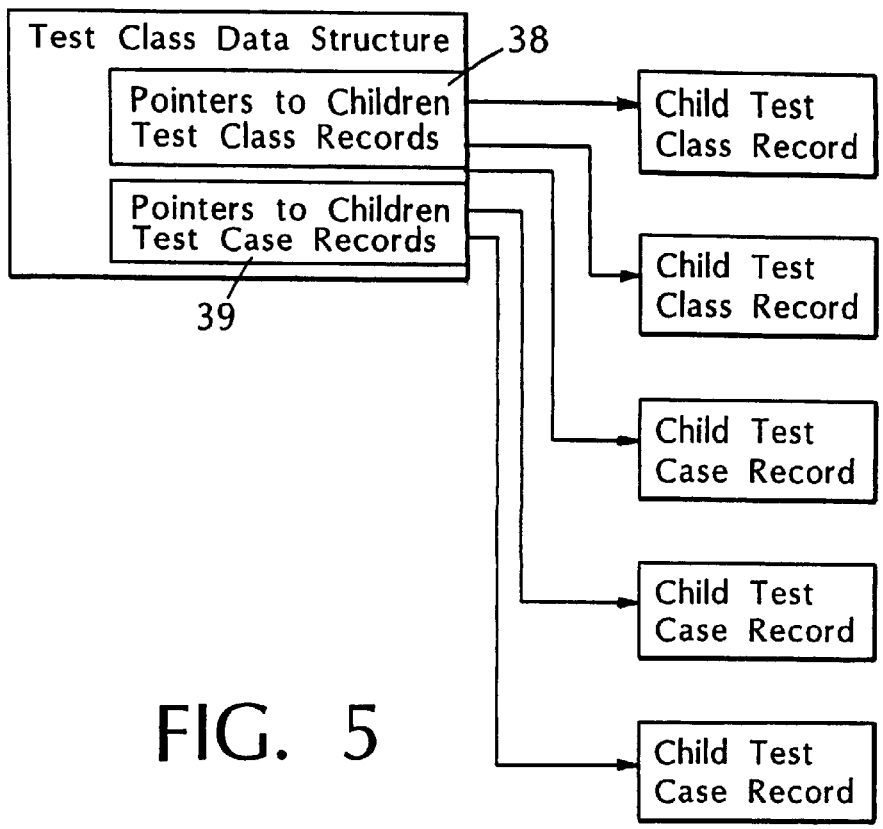
FIG. 5 is a block diagram of a test class data structure and children test class and test case records, the test class data structure containing pointers to the children records, in accordance with the invention.

Shown in FIG. 5 is a test class data structure that contains a list of pointers to the child test class records 38 and a list of pointers to child test case records 39. The test driver process need only have a pointer to the data structure that has information about the root class. Given the pointer to the root class, the test driver can "walk" down the hierarchy accessing data structures of all descendant test classes and cases, because the record corresponding to any test class contains pointers to records of all its child test classes and cases.

The test driver process contains the software code required to understand the test hierarchy and to follow the test execution steps shown in FIG. 6 (discussed below) to execute the various rules and test cases in correct order. The test driver also records the results of all the test classes and test cases in a file that the user can view at a later point in time.

To execute a rule or run command, the test driver sends a message via an open socket connection to the test engine instructing it to execute the command. The message contains the command to be executed, the expected exit status of the command that indicates success, the timeout value for the command, and the environment variables that need setting before the command is invoked.

When the test engine finishes executing the command, it sends the exit status of the command to the test driver. If a command did not succeed, a failure message describing the cause of failure is sent back to the test driver. If the command did not complete within the timeout value, the test engine process terminates the command and determines that the command has failed and outputs the failure description message of "Command timed out". The test driver uses the result returned by the test engine process and continues to traverse the test hierarchy.

In the illustrated embodiment, the outcome of a test case is "unrunnable," "pass," or "fail." A test class does not have a pass-fail outcome, but it can have an "unrunnable" outcome when one of its setup commands fails. For instance, if the setup command for a class fails, that class and all its descendants are recorded in the result file as "unrunnable". In other words, if the setup command defined at a test class level fails, then none of the rules for the descendants are executed. If the setup command for a test case fails, the run command is skipped and only the cleanup commands of the test case are executed. However, this failure does not affect other test cases and classes. Cleanup commands for test cases and classes are executed regardless of the outcome of the test.

In some instances all the tests (test cases and classes) that are descendants of a test class may need to have a common setup or cleanup command. To enable this, the test management system allows a rule to be "inherited" to descendant test classes, test cases, or both. A setup or a cleanup command defined at a test class level can be applied or inherited as follows:

only at the class level
    apply to all descendant classes (including current class)
    apply only to all descendant cases
    apply to all descendant classes and cases (including current class)

The inheritance scheme saves the effort of repeatedly defining the same rules for individual tests. For instance, test cases that have the same setup requirements can be grouped together or they can belong to classes that descend from the same ancestor class. This scheme also allows easy administration of the tests. Rules that need to be inherited can be modified at one point instead of at all the tests.

Setup commands inherited from ancestor test classes are executed before commands defined at the current test case or class. Setup commands inherited from classes higher up in the hierarchy are executed before those lower in the test hierarchy. For pass-fail commands and cleanup commands, the order is reversed.

Pass-fail commands are always executed by the test engine, and the results of a test case or class always recorded by the test driver.

Figure 6:
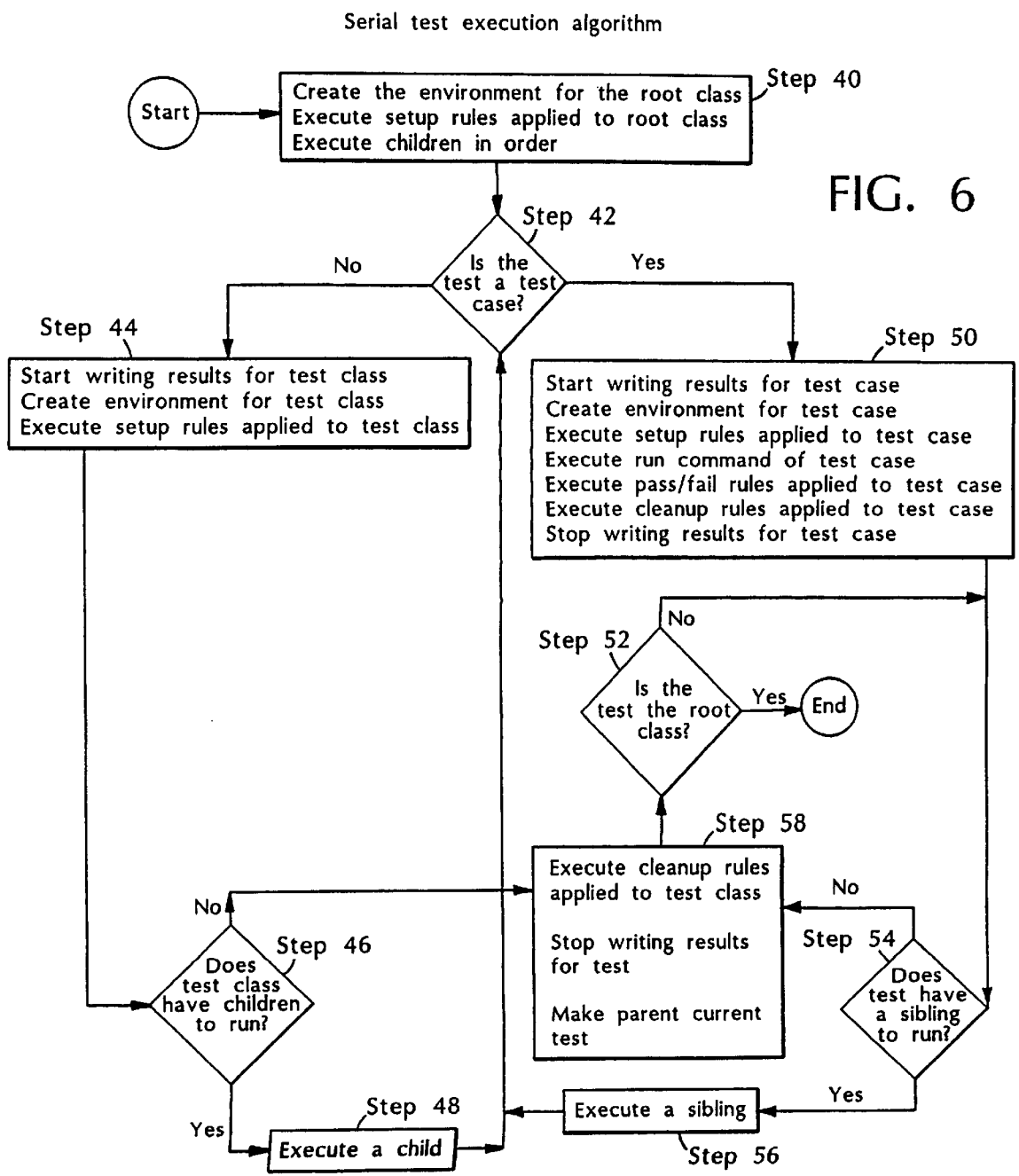
FIG. 6 is a flowchart diagram of a serial test execution algorithm according to the invention.

FIG. 6 shows the steps the test driver follows when a collection of tests in a test structure is to be executed. The steps in FIG. 6 cause all test cases and classes in the test hierarchy to be executed. The tests higher up in the hierarchy execute before those that are lower. Tests are executed in a specific order.

In Step 40, the test driver computes the set of environment variables specified at the root class and instructs the test engine to run the setup commands of the root class one after the other. Once the setup commands complete successfully, the results are recorded and the test driver selects the next test case or test class to process based on the test execution sequence number that is associated with the test case or test class. If the setup command of a class fails, all its descendants in the hierarchy are marked as unrunnable. The cleanup commands of the descendants and the class are executed. The execution passes to the next test case or test class.

In Step 42 the test driver determines whether the next test is a test class. If so, the test driver starts writing the test results, computes the environment variable list, and executes the class's setup commands in order. If any setup command fails, the results of the current test class and all its descendants are recorded as "unrunnable" and the class's cleanup commands are executed before the test driver completes the execution of the class. In such a case, none of the descendant test cases or classes are executed. If all the setup commands are successful, the child test classes and cases are executed in order. Once all the child test classes and cases are executed, the test driver executes the cleanup commands (Step 58).

If, in Step 42, the test driver determines that the next test is a test case, the test driver, in Step 50, starts writing the test results, and computes the environment variables for the test case and those specified in the ancestor classes. Also in Step 50, the test driver instructs the test engine to execute the setup commands in order. If a setup command fails, the test is recorded as "unrunnable" and the run command is not executed but the cleanup commands are executed. If the setup commands complete successfully, the test case's run command is executed. If the run command does not succeed, the test is recorded as "failed." If the run command succeeds, the pass-fail commands are executed. If any pass-fail command fails, the test is recorded as "failed".

In Step 50 the test driver executes the cleanup commands last. Their outcomes are recorded, but do not affect the outcome of the test case.

Figure 7:
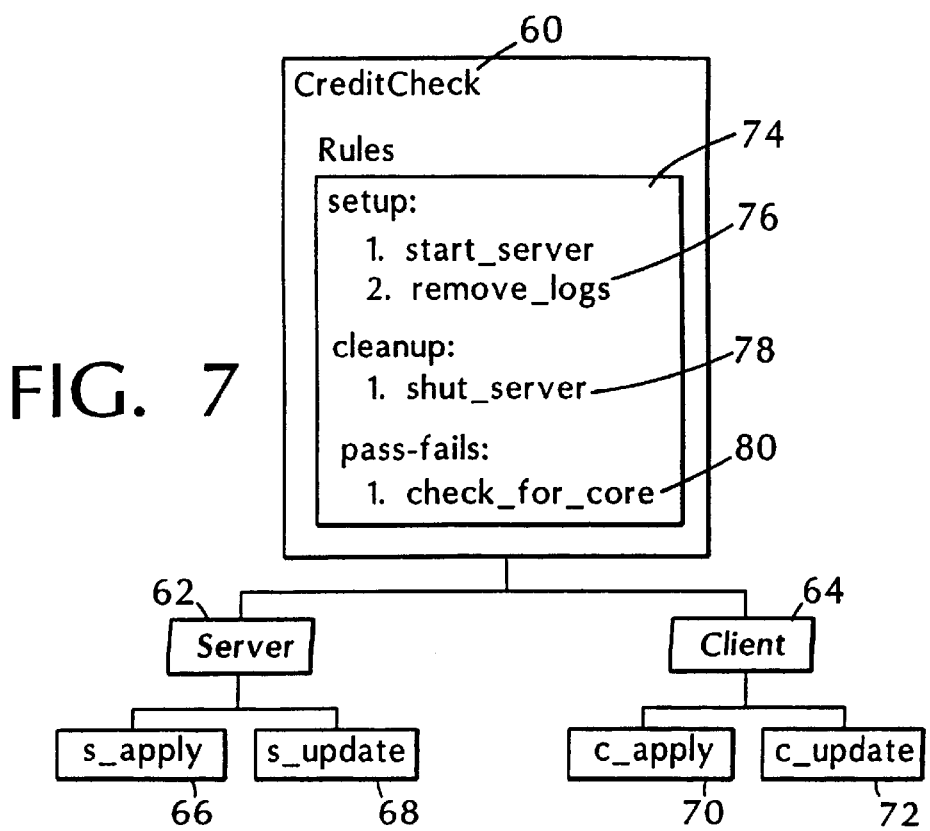
FIG. 7 is a block diagram of a hierarchy of test classes CreditCheck, Server, and Client and test cases s_apply, s_update, c_apply, and c_update in accordance with the invention.

FIG. 7 shows a test hierarchy for a sample application. The application is a simple credit system that grants or denies credit to applicants based on their credit rating. The application has a client-server architecture. The root class 60 "CreditCheck" has two child test classes, Server 62 and Client 64.

The Server class 62 has child test case s_apply 66 and child test case s_update 68. These test cases directly interact with the server to verify the "apply" and "update" functions of the application. The Client class 64 has child test cases c_apply 70 and c_update 72, which verify the same apply and update functions by interacting with the client interface.

In FIG. 7 a set of rules for the CreditCheck root node 60 is shown. The setup command start_server 74 starts the server. It is defined at the root so that the server starts before any tests execute. This setup command is not inherited. The setup command remove_logs 76 removes any files containing logs of what occurred in previous test runs and is inherited by all the descendant test cases and classes. The cleanup command shut_server 78 closes down the server and is not inherited. The pass-fail command check_for_core 80 checks for a fatal failure and is inherited by all descendant test cases and classes.

Figure 8:
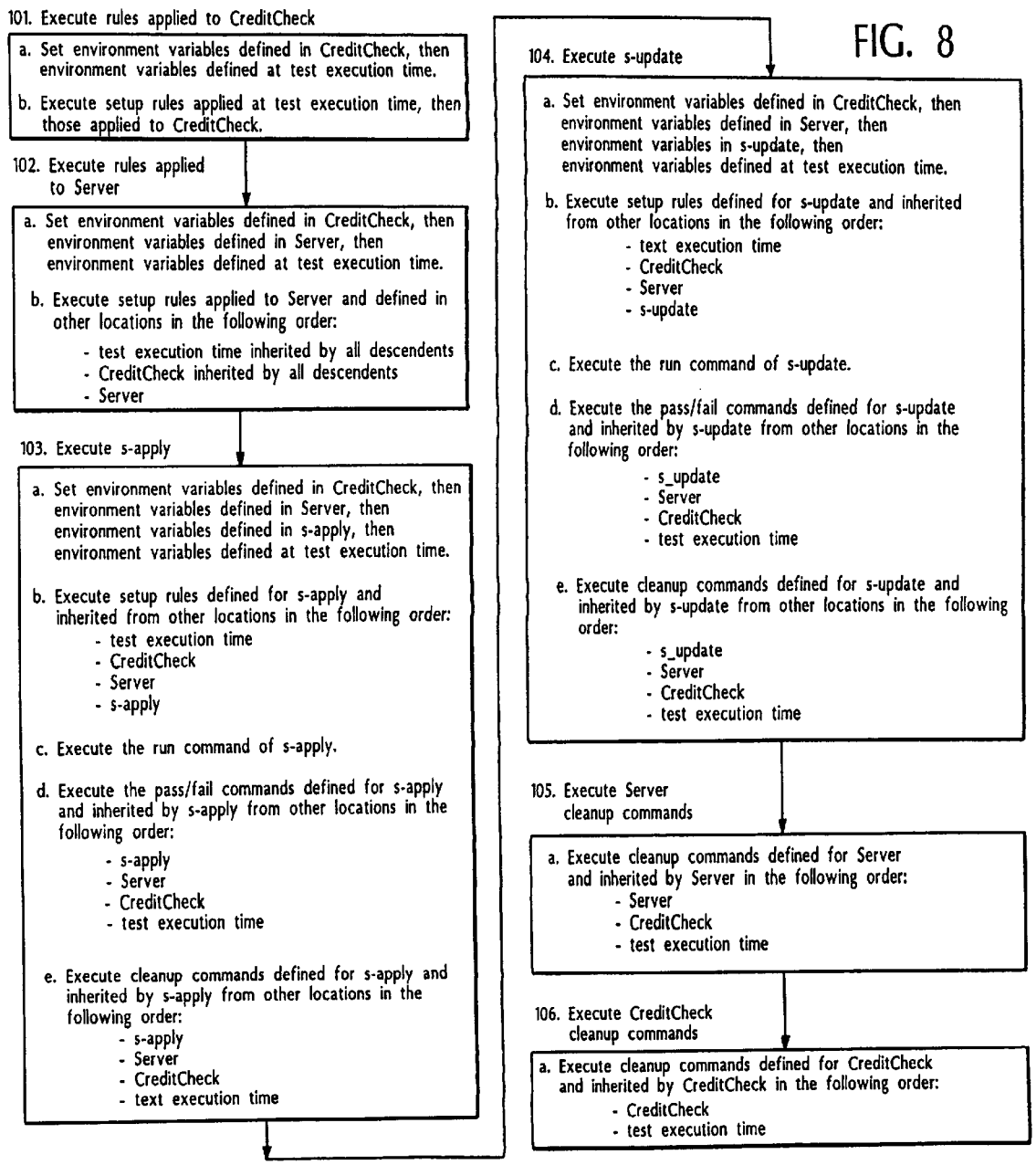
FIG. 8 is a flowchart diagram of a test execution algorithm corresponding to execution of the test class Server in the hierarchy of FIG. 7.
Figure 8B:
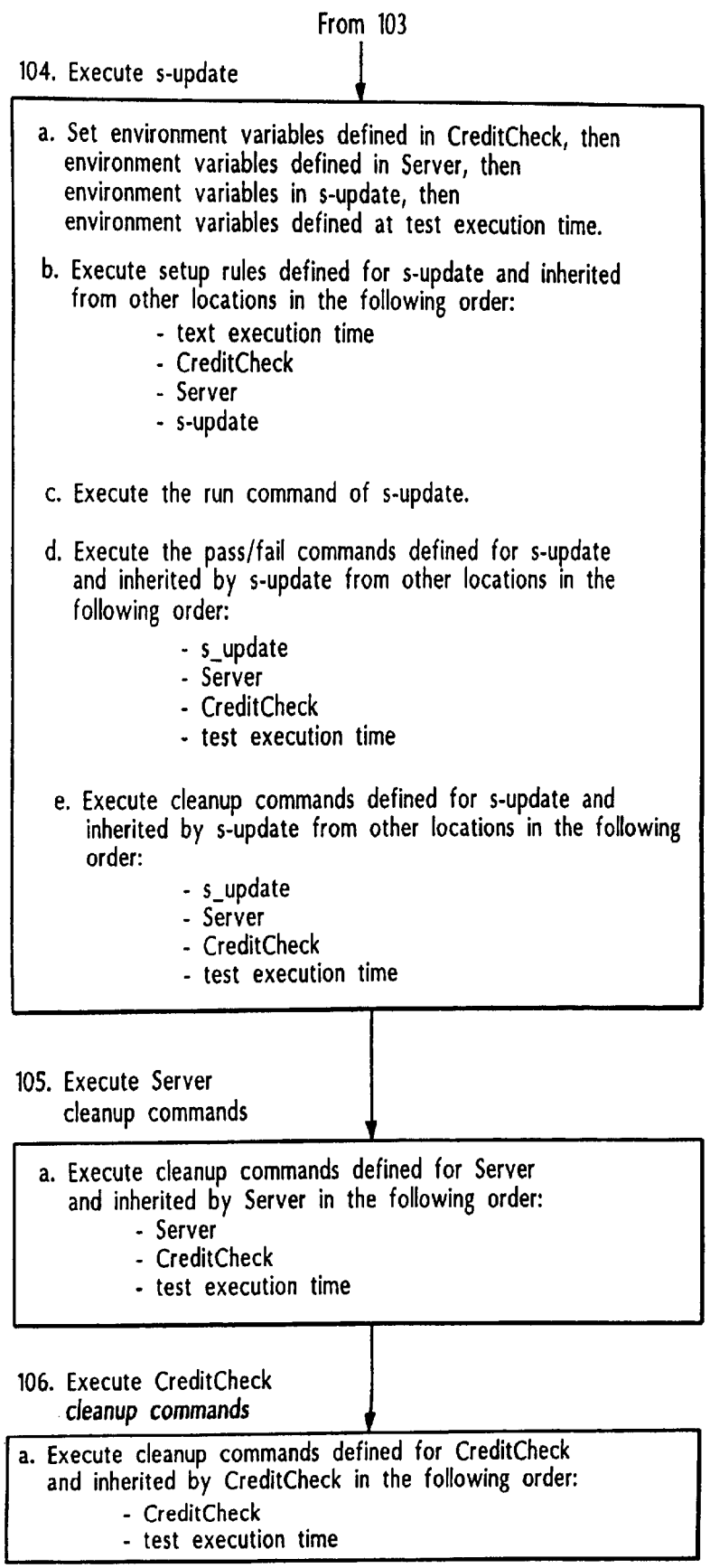

FIG. 8 shows the steps taken when the "Server" class 62 executes (and thus when the test cases s_apply and s_update execute), based on the steps described in FIG. 6.

In Step 101, the test management system executes setup and environment rules for the root node CreditCheck. The environment variables defined in the root node CreditCheck are set before any environment variables defined at test execution time. Any setup commands defined at test execution time are executed before any setup commands defined in the root node CreditCheck In Step 102, the test management system executes the pre-execution rules applied to the test class Server. The environment variables defined in CreditCheck are set before the environment variables defined in Server, which are set before any environment variables defined at test execution time. Any setup commands defined at test execution time and inherited to the descendant class Server are executed before any setup commands defined in CreditCheck that are inherited to Server, which are executed before the setup commands defined in Server.

In Step 103, the test case s_apply is executed. The environment variables are set according to the same scheme described above, with the environment variables defined in s_apply being set after the environment variables defined in Server and CreditCheck but before the environment variables defined at test execution time. Thus, environment variables defined at test execution time override all other environment variables at any level in the test hierarchy for all tests. The setup commands are executed according to the same scheme described above, with the setup commands defined in s_apply being executed last. Then the test management system executes the run command of s_apply. Then the test management system executes the pass-fail commands defined in and applied to s apply, then any pass-fails command defined in Server and inherited by s_apply, then any pass-fail commands defined in CreditCheck and inherited by s_apply, and then any pass-fail command defined at test execution time and applied to s_apply. Then the test management system executes cleanup commands of s_apply in the same order in which it executed pass-fail commands applied to s_apply.

In Step 104, the test case s_update is executed in the same manner as the test case s_apply.

In Step 105, the test management system executes the cleanup commands defined in and applied to Server, then any cleanup commands defined in CreditCheck and inherited by Server, and then any cleanup commands defined at test execution time and applied to Server.

In Step 106, the test management system executes the cleanup commands defined in and applied to CreditCheck, and then any cleanup commands defined at test execution time.

Thus, the steps to run Server started at the CreditCheck root 60 and travelled down the hierarchy to Server and its test cases and back up the hierarchy to CreditCheck root 60.

The placement of s_apply and s_update in the hierarchy signifies that the designer of the test hierarchy wanted the rules of CreditCheck and Server to govern s_apply and s_update.

Steps 103 and 104 show the that test cases inherit the environment variables of their ancestors and inherit setup, cleanup, and pass-fail rules defined in their ancestors and passed down for their descendant test cases to inherit. In contrast to a test class, a test case executes a run command and pass-fail commands.

A test case executes as a unit. The environment variables are set, then setup rules execute before the run command and the pass-fail commands. The test's cleanup rules execute immediately after the pass-fail command. This is in contrast to the test classes whose setup and cleanup rules are separated by the execution of the rules and the run commands of descendant tests.

As described above, once the test cases execute, the system executes the cleanup rules applied to the Server class in Step 105 and the root class CreditCheck in Step 106.

The test management system according to the invention integrates with "point tools" that are used to test software application. The "point tools" with which the test management system can be integrated can be grouped into two broad categories.

The first category of these point tools consists of tools that create tests, in order to enable a user to test a certain aspect of the software program. The test management system interacts with, or "invokes," these types of tools in connection with test creation, test execution, and result reporting.

Once the test has been created by the test creation tool, the test management system knows how to run the test by invoking the test creation tool, determining the result of the test, and including any reports and other information produced by the tool as part of the result information of the test.

In connection with the test creation phase, the test management system invokes the point tool after it executes setup commands and sets the environment variables defined in the test hierarchy, but before it executes cleanup commands. These setup and cleanup commands of the test management system enable the test created by the point tool to work correctly in conjunction with the other tests invoked by the test management system. Thus, the test management system according to the invention allows a test to be added to the hierarchy after the test management system has established the proper conditions, and allows cleanups to be performed once the test has been added to the hierarchy. It is easy to add a new test case or class to an existing class to extend the collection of tests. When the new test case or class is added then it gets to reuse the rules defined in the ancestor classes, just like its existing sibling tests.

In connection with the test execution phase, the test management system invokes the point tool again at the appropriate point in time and obtains the outcome (i.e., pass, fail, or unrunnable) of the test created by the point tool as determined by the point tool.

In connection with the result reporting phase, the test management system includes, in addition to pass-fail information, any report produced by the point tool with respect to the test created by the point tool.

The second category of point tools are used to help analyze the state of a software program. Some of these point tools provide metrics on the software program itself or find defects, and others give metrics on how much of the software program has been tested (i.e., a code coverage) by a given test when the tool is used in conduction with the test. The test management system integrates with this category of tools to facilitate the use of these tools with the numerous tests stored by the system in an automated fashion.

The ability to define rules at test execution time, which is discussed above, makes it easy to integrate the test management system with an analysis point tool. In particular, choosing an integration with an analysis point tool at execution time consists of applying to the hierarchy the rules that have been defined for this integration. These rules perform additional actions that are specific to the analysis tool integration. It is easy to define new integrations, because the user need only define the rules that are specific for this integration, and because rules that are general to the test management system can be extended to work with additional analysis point tools without modification.

In summary, the test management system according to the invention utilizes concepts such as classes and inheritance to manage and provide structure to the complex process of software testing, which usually involves numerous tests and interrelationships between the various tests. Some of the core functions of the test management system are test management, test execution control, and integrations with other testing tools. The test management system according to the invention provides the infrastructure to create and store the tests, to specify an execution order for the tests, and to pick and choose a set of tests cases for execution. The test management system also provides a way of specifying setup and cleanup commands for the tests, and controls the execution of these tests. The tests can run unattended, i.e. without human intervention.

Furthermore, the test management system is extensible and organizes tests in a tree hierarchy in the form of test classes and test cases, wherein there is a distinct parent-child relationship between the various tests in the hierarchy. There is also an implicit execution order imposed by the tree hierarchy. Special knowledge of the steps necessary to run a test are encoded in the form of rules that can be defined at any node in the hierarchy. These rules can be inherited down to descendants allowing reuse of rules and easy administration of the overall test structure. This enables an elegant design of the test structure and makes the tests easy to maintain and administer. It also makes it easy to extend the system to work with other testing tools.

The following publication containing additional information pertaining to the present invention is hereby incorporated herein in its entirety by reference: CenterLine Software, Inc. (10 Fawcett Street, Cambridge, Mass.), "QC Advantage User's Guide and Reference," 1996.

There has been described novel and improved apparatus and techniques for computer software testing management. It is evident that those skilled in the art may now make numerous uses and modifications of and departures from the specific embodiments described herein without departing from the inventive concept.

Implementation of other aspects of the invention follow readily from knowledge of the basic invention. The invention may be implemented in hardware or software, or a combination of both. However, preferably, the invention is implemented in computer programs executing on programmable computers each comprising at least one processor, a data storage system (including volatile and non-volatile memory and/or storage elements), at least one input device, and at least one output device. Program code is applied to input data to perform the functions described herein and to generate output information. The output information is applied to one or more output devices, in known fashion.

Each program is preferably implemented in a high-level procedural or object-oriented programming language to communicate with a computer system. However, the programs can be implemented in assembly or machine language, if desired. In any case, the language may be a compiled or interpreted language.

Each such computer program is preferably stored on a storage media or device (e.g., ROM or magnetic diskette) readable by a general or special-purpose programmable computer, for configuring and operating the computer when the storage media or device is read by the computer to perform the procedures described herein. The inventive system may also be considered to be implemented as a computer-readable storage medium, configured with a computer program, where the storage medium so configured causes a computer to operate in a specific and predefined manner to perform the functions described herein.

What is claimed is:

1. A method of managing processes for ensuring quality of a software application, the method being implemented in a programmed computer comprising a processor, a data storage system, at least one input device, and at least one output device, the method comprising the steps of:

A) creating and storing in the data storage system of the computer a hierarchy of tests based on input data received through an input device of the computer, the tests comprising test classes and test cases, each test case being a procedure that has a run command for verifying at least one function of the software application, each test class being a collection of at least one descendant test case or test class, at least one of the tests in the hierarchy having at least one pre-execution rule for performing a pre-requisite action prior to execution of the test, at least one of the tests in the hierarchy having at least one post-execution rule for performing an action after execution of the test, at least one pre-execution or post-execution rule of at least one test in the hierarchy being a generic computer program inheritable by descendants of the test and at least one pre-execution or post-execution rule of at least one test in the hierarchy being a generic computer program that is not inheritable by descendants of the test;

B) executing any pre-execution rules of a root test class in the hierarchy;

C) executing a plurality of descendants of the root test class, comprising the following steps for each executed descendant:

c1) if a descendant is a test class, executing any pre-execution rules inherited from parents of the test class and any pre-execution rules of the descendant test class, then executing step C) for the descendant test class replacing the descendant test class of the root test class, and then executing any post-execution rules of the descendant test class and any post-execution rules inherited from parents of the test class; and c2) if a descendant is a test case, executing any pre-execution rules inherited from parents of the test case and any pre-execution rules of the test case, then executing a run command of the test case, and then executing any post-execution rules of the test case and any post-execution rules inherited from parents of the test case;

D) executing any post-execution rules of the root test class; and

E) applying output information, based on run command execution, to an output device of the computer.

2. The method of claim 1 wherein each test case is descendant-less.

3. The method of claim 1 wherein at least one of the tests comprises a pre-execution rule that is an environment variable, at least one of the tests comprises a pre-execution rule that is a setup command, and at least one of the tests comprises a post-execution rule that is a pass-fail command, and at least one of the tests comprises a post-execution rule that is a cleanup command.

4. The method of claim 3 wherein step c1) comprises setting any environment variables and executing any setup commands of a descendant test class, then executing step C) for the descendant test class replacing the descendant for the root test class, and then executing any cleanup commands of the descendant test class.

5. The method of claim 4 wherein step c2) comprises setting any environment variables and executing any setup commands of a test case, then executing a run command of the test case and executing any pass-fail command of the test case, and then executing any cleanup commands of the test case.

6. The method of claim 3 wherein at least one pre-execution or post-execution rule of at least one test in the hierarchy is inheritable by descendants of the test.

7. The method of claim 6 wherein step c1) comprises setting any environment variables inherited from the parents of the test class, in succession from the root test class, executing any environment variables of the test class, executing any setup commands inherited from the parents of the test class, in succession from the root test class, executing any setup commands of the test class, then executing step C) for the test class replacing the test class for the root test class, then executing any cleanup commands of the test class, and executing any cleanup commands inherited from the parents of the test class, in succession to the root test class.

8. The method of claim 7 wherein step c2) comprises setting any environment variables inherited from the parents of the test case, in succession from the root test class, executing any environment variables of the test case, executing any setup commands inherited from parents of the test case, in succession from the root test class, executing any setup commands of the test case, then executing a run command of the test case, executing a pass-fail command of the test case, and executing any pass-fail commands inherited from the parents of the test case, in succession to the root test class, and then executing any cleanup commands of the test case and executing any cleanup commands inherited from the parents of the test case, in succession to the root test class.

9. The method of claim 1 wherein at least some of the pre-execution and post-execution rules and the run commands are pre-stored in memory space corresponding to the hierarchy.

10. The method of claim 9 further comprising the step of defining at least one of the pre-execution and post-execution rules at test execution time.

11. A method of managing processes for ensuring quality of a software application, the method being implemented in a programmed computer comprising a processor, a data storage system, at least one input device, and at least one output device, the method comprising the steps of:

A) creating and storing in the data storage system of the computer a hierarchy of tests based on input data received through an input device of the computer, the tests comprising test classes and test cases, each test case being a procedure that has a run command for verifying at least one function of the software application, each test class being a collection of at least one descendant test case or test class, at least one of the tests in the hierarchy having at least one pre-execution rule for performing a pre-requisite action prior to execution of the test, at least one of the tests in the hierarchy having at least post-execution rule for performing an action after execution of the test;

B) executing any pre-execution rules of a root test class in the hierarchy;

C) executing a plurality of descendants of the root test class, comprising the following steps for each executed descendant:

c1) if a descendant is a test class, executing any pre-execution rules of the descendant test class, then executing step C) for the descendant test class replacing the descendant test class for the root test class, and then executing any post-execution rules of the descendant test class; and c2) if a descendant is a test case, executing any pre-execution rules of the test case, then executing a run command of the test case, and then executing any post-execution rules of the test case;

D) executing any post-execution rules of the root test class;

E) applying output information, based on run command execution, to an output device of the computer; and wherein at least some of the pre-execution and post-execution rules and the run commands are pre-stored in memory space corresponding to the hierarchy; and wherein the method further comprises defining at least one of the pre-execution and post-execution rules at test execution time; and wherein the at least one rule defined at test execution time permits operation of an analysis point tool that is independent of the tests in the hierarchy and that analyzes the state of the software application.

12. The method of claim 3 further comprising the step of defining at least one of the pre-execution and post-execution rules at test execution time, and wherein in steps c1) and c2) any environment variables defined at execution time are set after setting any other environment variables, any setup commands defined at execution time are executed prior to executing any other setup commands, any pass-fail commands defined at execution time are executed after executing any other pass-fail commands, and any cleanup commands defined at execution time are executed after executing any other cleanup commands.

13. The method of claim 12, wherein environment variables defined at test execution time override all other environment variables in the test hierarchy for all tests.

14. The method of claim 1 wherein pre-execution and post-execution rules at deeper levels in the hierarchy are more specialized than pre-execution and post-execution rules at higher levels in the hierarchy.

15. The method of claim 1 wherein each immediate child of at least one test class is associated with an execution sequence number, and each immediate child is executed in sequence according to the execution sequence number.

16. The method of claim 1, wherein:

step A) further comprises the step of adding to a pre-existing hierarchy a new test created by a point tool, the step of adding the new test comprising executing any pre-execution rules of any parents of the new test, then invoking the point tool in order to add the new test to the hierarchy, and then executing any post-execution rules of any parents of the new test; and step c2) comprises executing a run command of the new test case that invokes the point tool, in order to obtain outcome information for the test case.

17. A computer program, residing on a computer-readable medium, for managing processes to ensure quality of a software application, comprising instructions for causing a computer to:

A) create and store in the data storage system of the computer a hierarchy of tests based on input data received through an input device of the computer, the tests comprising test classes and test cases, each test case being a procedure that has a run command for verifying at least one function of the software application, each test class being a collection of at least one descendant test case or test class, at least one of the tests in the hierarchy having at least one pre-execution rule for performing a pre-requisite action prior to execution of the test, at least one of the tests in the hierarchy having at least one post-execution rule for performing an action after execution of the test, at least one pre-execution or post-execution rule of at least one test in the hierarchy being a generic computer program inheritable by descendants of the test and at least one pre-execution or post-execution rule of at least one test in the hierarchy being a generic computer program that is not inheritable by descendants of the test;

B) execute any pre-execution rules of a root test class in the hierarchy;

C) execute a plurality of descendants of the root test class, comprising the following steps for each executed descendant:

c1) if a descendant is a test class, executing any pre-execution rules inherited from parents of the test class and any pre-execution rules of the descendant test class, then executing step C) for the descendant test class replacing the descendant test class of the root test class, and then executing any post-execution rules of the descendant test class and any post-execution rules inherited from parents of the test class; and c2) if a descendant is a test case, executing any pre-execution rules inherited from parents of the test case and any pre-execution rules of the test case, then executing a run command of the test case, and then executing any post-execution rules of the test case and any post-execution rules inherited from parents of the test case;

D) execute any post-execution rules of the root test class; and

E) apply output information, based on run command execution, to an output device of the computer.

* * * * *